United States Patent
Cwik

(10) Patent No.: US 10,623,811 B1
(45) Date of Patent: Apr. 14, 2020

(54) METHODS AND SYSTEMS FOR DETECTING AUDIO OUTPUT OF ASSOCIATED DEVICE

(71) Applicant: Amazon Technologies, Inc., Seattle, WA (US)

(72) Inventor: Dennis Francis Cwik, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/143,623

(22) Filed: Sep. 27, 2018

Related U.S. Application Data

(63) Continuation of application No. 15/193,916, filed on Jun. 27, 2016, now Pat. No. 10,091,545.

(51) Int. Cl.

| | |
|---|---|
| H04N 21/439 | (2011.01) |
| G06F 3/16 | (2006.01) |
| H04N 21/41 | (2011.01) |
| H04N 21/4415 | (2011.01) |
| H04N 21/643 | (2011.01) |
| H04N 21/858 | (2011.01) |
| H04N 21/254 | (2011.01) |
| G10L 15/26 | (2006.01) |
| H04N 21/475 | (2011.01) |
| G10L 25/51 | (2013.01) |

(52) U.S. Cl.
CPC .......... *H04N 21/439* (2013.01); *G06F 3/165* (2013.01); *G06F 3/167* (2013.01); *G10L 15/26* (2013.01); *H04N 21/2541* (2013.01); *H04N 21/4126* (2013.01); *H04N 21/4415* (2013.01); *H04N 21/4751* (2013.01); *H04N 21/64322* (2013.01); *H04N 21/8586* (2013.01); *G10L 25/51* (2013.01)

(58) Field of Classification Search
CPC ........ H04N 21/439; G06F 3/165; G10L 15/26
See application file for complete search history.

(56) References Cited

U.S. PATENT DOCUMENTS

| | | | | |
|---|---|---|---|---|
| 7,039,590 | B2 * | 5/2006 | Luchaup | ................ G08C 17/02 367/197 |
| 8,106,750 | B2 * | 1/2012 | Cho | ....................... G08C 23/04 340/12.5 |

(Continued)

FOREIGN PATENT DOCUMENTS

EP    1755242 A2 *  2/2007  ............. H04B 11/00

*Primary Examiner* — Brian L Albertalli
(74) *Attorney, Agent, or Firm* — Pierce Atwood LLP

(57) ABSTRACT

Systems and methods for determining whether a first electronic device detects a media item that is to be output by a second electronic device is described herein. In some embodiments, an individual may request, using a first electronic device, that a media item be played on a second electronic device. The backend system may send first audio data representing a first response to the first electronic device, along with instructions to delay outputting the first response, as well as to continue sending audio data of additional audio captured thereby. The backend system may also send second audio data representing a second response to the second electronic device along with the media item. Text data may be generated representing the captured audio, which may then be compared with text data representing the second response to determine whether or not they match.

20 Claims, 6 Drawing Sheets

(56) References Cited

U.S. PATENT DOCUMENTS

| | | | | |
|---|---|---|---|---|
| 8,195,765 | B2* | 6/2012 | Julia | H04L 41/0806 |
| | | | | 709/217 |
| 9,792,902 | B2* | 10/2017 | Miyasaka | G10L 21/0208 |
| 2003/0169862 | A1* | 9/2003 | Howard | H04M 11/002 |
| | | | | 379/102.02 |
| 2007/0106941 | A1* | 5/2007 | Chen | H04N 7/17318 |
| | | | | 715/728 |
| 2008/0153531 | A1* | 6/2008 | O'Shaughnessy | H04L 67/24 |
| | | | | 455/518 |
| 2014/0223477 | A1* | 8/2014 | Han | G10L 15/22 |
| | | | | 725/37 |
| 2015/0154976 | A1* | 6/2015 | Mutagi | H04L 12/281 |
| | | | | 704/275 |
| 2015/0348554 | A1* | 12/2015 | Orr | G06F 3/167 |
| | | | | 704/275 |
| 2016/0104483 | A1* | 4/2016 | Foerster | G10L 25/78 |
| | | | | 704/275 |
| 2017/0123878 | A1* | 5/2017 | Chu | G06F 11/0736 |
| 2017/0185376 | A1* | 6/2017 | Chang | G06F 3/1228 |
| 2017/0242653 | A1* | 8/2017 | Lang | G10L 15/22 |
| 2017/0249943 | A1* | 8/2017 | Civelli | G10L 15/32 |
| 2017/0330565 | A1* | 11/2017 | Daley | G10L 15/08 |
| 2017/0330566 | A1* | 11/2017 | Trott | G10L 15/08 |
| 2018/0137860 | A1* | 5/2018 | Koyama | G10L 15/00 |
| 2019/0279635 | A1* | 9/2019 | Shah | H04N 21/42203 |

\* cited by examiner

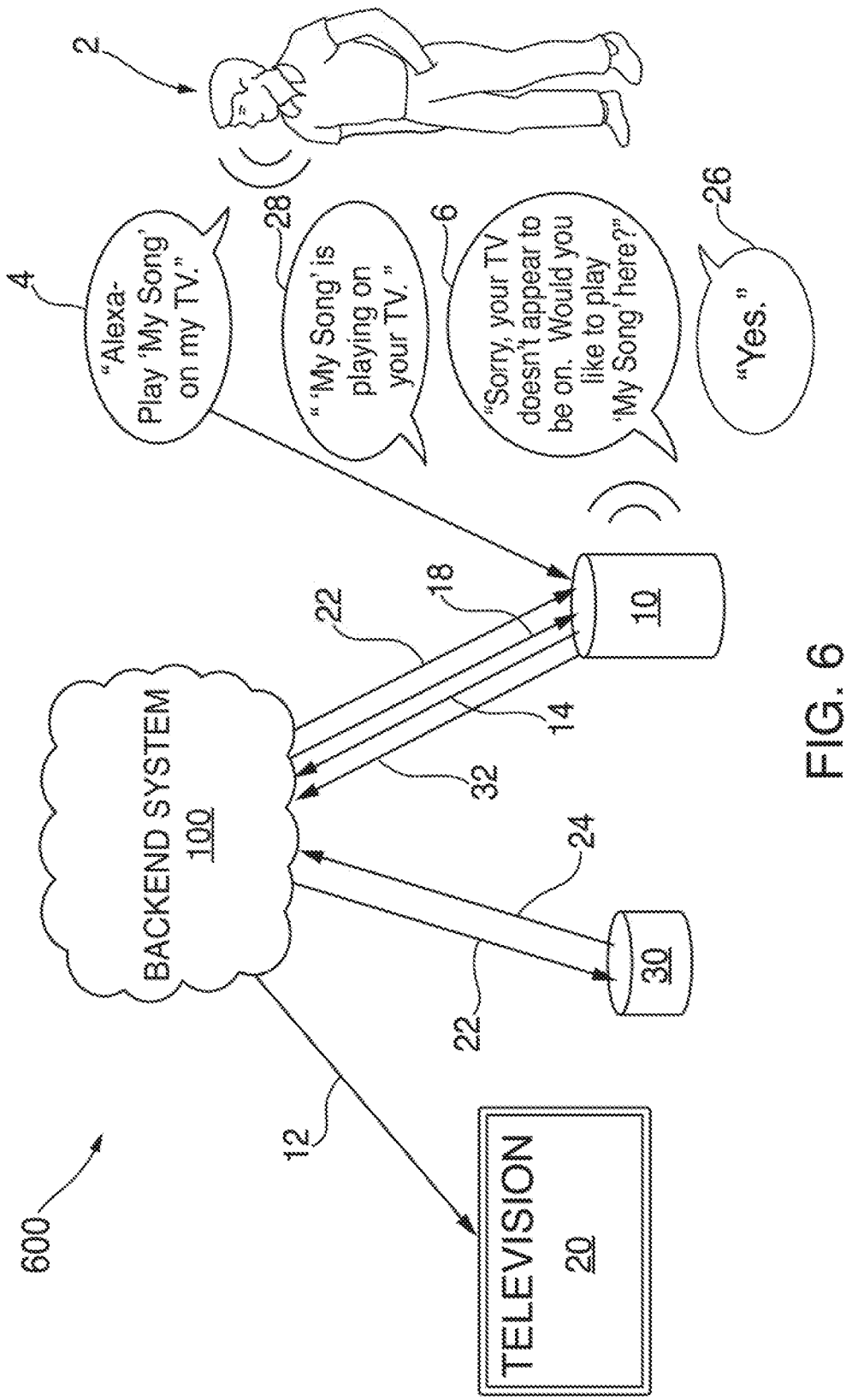

METHODS AND SYSTEMS FOR DETECTING AUDIO OUTPUT OF ASSOCIATED DEVICE

CROSS-REFERENCE TO RELATED APPLICATIONS

The present application is a continuation of, and claims priority to, U.S. application Ser. No. 15/193,916 filed Jun. 27, 2016 and entitled "Methods and Systems for Detecting Audio Output of Associated Device, in the name of Dennis Francis Cwik, and scheduled to issue on Oct. 2, 2018 as U.S. Pat. No. 10,091,545. The above application is incorporated herein by reference in its entirety.

BACKGROUND

Voice activated electronic devices continue expand their capabilities. For instance, voice activated electronic devices may access information, play audio, and be used to control other devices.

BRIEF DESCRIPTION OF THE DRAWINGS

FIG. 6 is an illustrative diagram of another system for outputting an additional audio message on an electronic device in response to another electronic device not detecting an audio message, in accordance with various embodiments.

DETAILED DESCRIPTION

Figure 1:
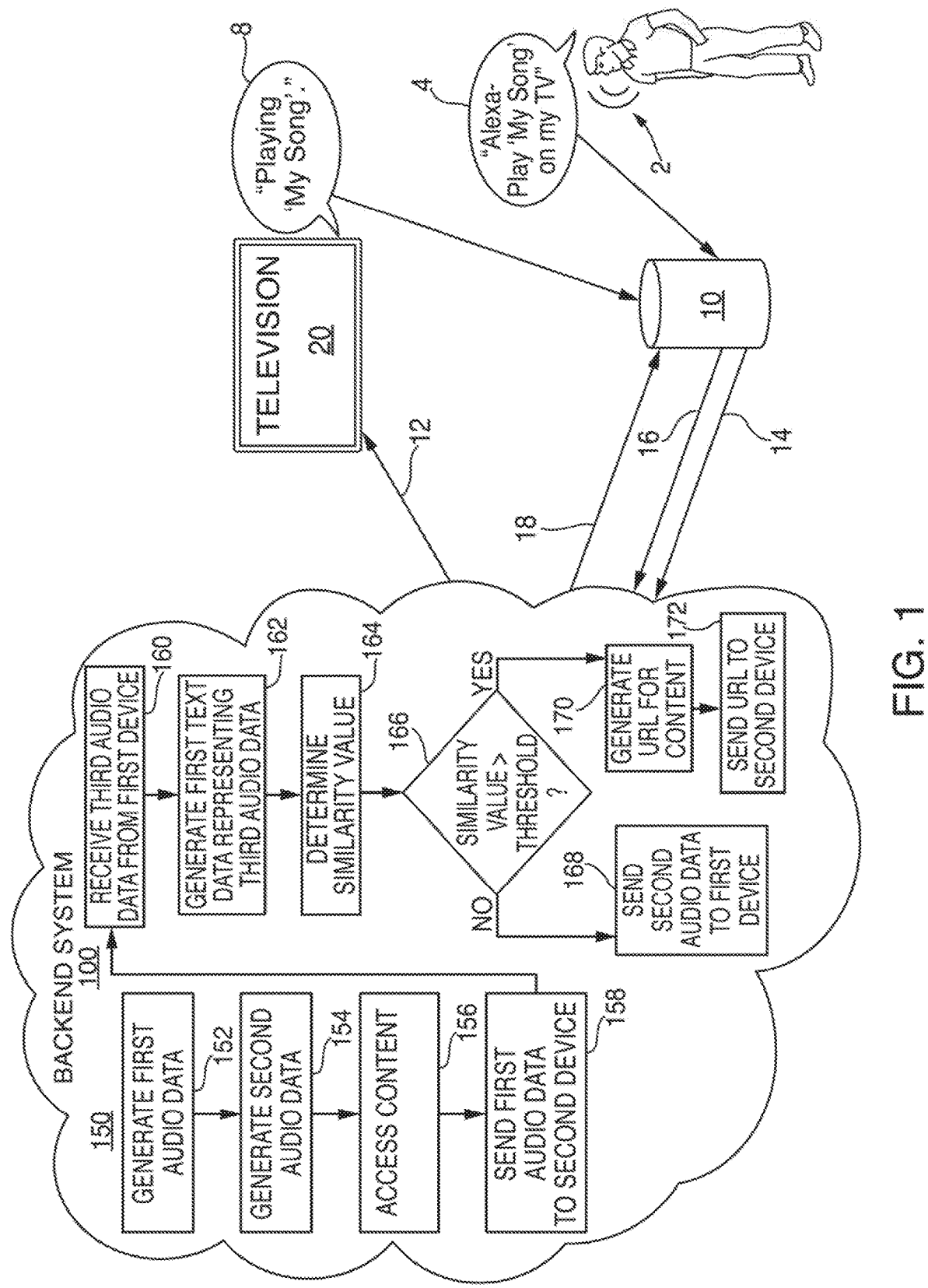
FIG. 1 is an illustrative diagram of a system for determining, using a voice activated electronic device, whether another electronic device outputs an audio message, in accordance with various embodiments.

The present disclosure, as set forth below, is generally directed to various embodiments of methods and devices for determining, using a first electronic device, whether a second electronic device is outputting a media item that was requested be output by the second electronic device. An individual may direct an utterance to a first electronic device, where the utterance may be a request for content to be output using a second electronic device. If the individual and/or the first electronic device is not within earshot of the second electronic device, then the individual and/or first electronic device may not know whether the utterance was processed, and therefore whether the media is being played by the second electronic device.

In response to determining that the utterance's intent, in some embodiments, the first electronic device may continue sending, to a backend system, first audio data representing locally captured audio. For instance, the backend system may determine a speech endpoint of the utterance, and determine whether or not to stop receiving any additional audio data representing locally captured sounds. Additionally, the backend system may generate first text data representing a first audio message may be sent to a the second electronic device that indicates that the content is being output. The backend system may further generate first audio data representing the text data, and may send that first audio data to the second electronic device so that the first audio message may be played by the second electronic device. The first electronic device may then monitor sounds received by a microphone of the first electronic device, to determine whether the first audio message was, or is being, played by the second electronic device. For instance, because the backend system did not cause the first electronic device to stop sending first audio data representing locally captured audio, the backend system may receive the first audio data from the first electronic device, and may begin performing automated speech recognition processing to the first audio data. By performing automated speech recognition processing, second text data representing the first audio data may be generated. The second text data may then be compared with the first text data, and a similarity value indicating how similar to the first text data and the second text data are to one another.

In some embodiments, a determination may be made as to whether the similarity value is greater than a predefined similarity threshold value. If the similarity value is greater than the predefined similarity threshold, this may indicate that the first audio message was likely played by the second electronic device. Therefore, the second electronic device is likely powered on, unmuted, or similarly configured such that content may be output thereby. In this particular scenario, the backend system may cause the first electronic device to stop sending any additional audio data representing local sounds to the backend system. Furthermore, the backend system may generate a uniform recourse locator ("URL"), or any other means, for providing the second electronic device with the requested content, such that it may be output by the second electronic device.

If, however, the similarity value is less than or equal to the predefined similarity value, then this may indicate that the first audio message was likely not played by the second electronic device. It may also indicate that the that second electronic device is not properly configured to output content (e.g., audio and/or video). For example, the second electronic device may be powered off, muted, set on a different media input mode (e.g., HDMI 1, HDMI 2, USB, Cable, etc.), or configured in any other manner such that the content, if sent to the second electronic device, may likely not be output. Further still, the similarity value being less than or equal to the predefined similarity value may indicate that the first electronic device is located in a first location that is not capable of receiving audio signals output by one or more speakers of the second electronic device. For example, the first electronic device may be physically separated by a great distance (e.g., 10 feet, 50 feet, etc.), one or more walls, one or more floors, and/or in any other suitable manner such that the first electronic device would not be able to receive audio signals of the audio message even if the second electronic device output the first audio message.

If, as mentioned above, the similarity value is less than predefined similarity threshold value, then the backend system may generate third text data representing a second audio message, generate second audio data representing the third text data, and may send the second audio data to the first electronic device. Furthermore, the backend system may also cause the first electronic device to stop sending any additional audio data representing local sounds such that the second audio message is not processed by the backend system. Upon receipt, the first electronic device may, therefore, output the second audio message, indicating to the individual that the requested content likely is not being play, or not going to begin being played, by the second electronic device. This may allow the individual to determine one or more actions that may be taken to configure the second electronic device such that the content may be able to be output thereby.

As an illustrative example, an individual may speak an utterance, prefaced by a wakeword, to their sound controlled electronic device, where the utterance requests content to be output on a particular target device. For example, an individual may ask that a song play on their television by saying, "Alexa—Play 'Song 1' on my TV." In response to detecting the wakeword, the sound controlled electronic device may send audio data representing the utterance to a backend system. The backend system may generate text data representing the audio data, and may determine the utterance's intent. Continuing the previous example, the determined intent may be for audio having a title, "Song 1" be play by the individual's television. The backend system may then be configured to determine a location of the song so that song may be played on the television.

In some embodiments, a customer identifier (e.g., one or more numbers, letters, and/or characters) associated with the sound controlled electronic device may be received by the backend system along with the audio data. The customer identifier may indicate a user account on the backend system that is associated with the sound controlled electronic device and/or a household where the sound controlled electronic device is located. In one embodiment, the user account may also indicate one or more additional electronic devices also associated with that user account. For instance, the user account may include one or more IP addresses, MAC addresses, and/or device identifiers, such as a serial number, of each additional electronic device associated with the identified user account.

In one non-limiting embodiment, the determined intent may be for content, such as a song, movie, video, radio program, or any other type of content, to be output by a particular electronic device, different from the sound controlled electronic device with which the utterance was spoken. The backend system may determine a second electronic device associated with the user account likely corresponding to the different electronic device. This determination may be made, for instance, based on a type of content that was requested. For example, if the type of content is video, then the backend system may determine that a particular electronic device may be best suited to output the video. As another example, a pre-set configuration may be stored with the user account that indicates that, for any request for content to be output received from a first device, a second device is to be used to output that content. In some embodiments, the backend system may determine an IP address of a television or other networked device associated with the user account may be selected as a target device for the content to be output by.

In some embodiments, the backend system may be further configured to send the media item to the first electronic device in response determining that the similarity value is less than predefined similarity threshold value. The backend system may, alternatively, generate and send a link to the media item to the first electronic device such that the first electronic device outputs the media item thereon. Furthermore, in one embodiment, an additional audio message may be sent from the backend system to the first electronic device prior to the media item being played, indicating that the media item is going to begin playing on the first electronic device.

In some embodiments, in response to determining that the similarity value is less than predefined similarity threshold value, the backend system may be configured to send a configuration request, or instruction, to the second electronic device. The configuration request may cause the second electronic device to power on, unmute, have its volume level increased, and/or cycle through its various input modes. The configuration request, therefore, may enable the second electronic device to have its settings/mode modified such that the second electronic device may output the media item. The second electronic device may then send a confirmation to the backend system, indicating that the second electronic device is in an appropriate mode or configuration such that it may output the media item thereon. The second electronic device may, alternatively, send a confirmation instruction to the first electronic device, indicating that the second electronic device is now in a proper mode for outputting the media item. Therefore, the backend system may generate and send a link to the media item to the second electronic device such that the media item may be output by the second electronic device.

In some embodiments, the first electronic device may be a sound controlled electronic device. A sound controlled electronic device, as described herein, may correspond to any device capable of being activated in response to detection of a specific word (e.g., a word, a phoneme, a phrase or grouping of words, or any other type of sound, or any series of temporally related sounds). For example, a voice activated electronic device is one type of sound controlled electronic device. Such voice activated electronic devices, for instance, are capable of generating and sending audio data to a backend system, such as the backend system mentioned previously, in response to detecting a wakeword.

Spoken voice commands, in some embodiments, may be prefaced by a wakeword, which may also be referred to as a trigger expression, wake expression, or activation word. In response to detecting an utterance of the wakeword, a voice activated electronic device may be configured to detect and interpret any words that subsequently follow the detected wakeword as actionable inputs or commands. In some embodiments, the voice activated electronic device may be activated by a phrase or grouping of words, which the voice activated electronic device may also be configured to detect. The voice activated electronic device, therefore, may also be able to detect and interpret any words subsequently following that phrase or grouping of words.

As used herein, the term "wakeword" may correspond to a "keyword" or "key phrase," an "activation word" or "activation words," or a "trigger," "trigger word," or trigger expression." One exemplary wakeword may be a name, such as the name, "Alexa," however persons of ordinary skill in the art will recognize that any word (e.g., "Amazon"), or series of words (e.g., "Wake Up" or "Hello, Alexa") may alternatively be used. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated electronic device may be any series of temporally related sounds.

In some embodiments, an individual may speak an utterance to a first electronic device (e.g., a requesting device) requesting that content to be output by a second electronic device (e.g., a target electronic device). As an illustrative example, an individual may speak an utterance including a wakeword followed by an invocation to their voice activated electronic device. For example, an individual may say, "Alexa—play 'My Song' on my TV." Thus, in response to detecting the utterance of the wakeword, "Alexa," the voice activated electronic device may send audio data representing the utterance to the backend system.

A voice activated electronic device may monitor audio input data detected within its local environment using one or more microphones, transducers, or any other audio input device located on, or in communication with, the voice activated electronic device. The voice activated electronic device may, in some embodiments, send the audio data representing the detected audio input data to the backend system for processing or analyzing the utterance, generating a response to the utterance, and/or causing an action to occur, such as directing an instruction (e.g., output content, open application, unlock door, turn on lights, etc.) to another device (e.g., a target device). Additionally, the voice activated electronic device may store one or more wakewords within its local memory. If a determination is made that audio data received from the audio input device(s) (e.g., microphone(s)) matches the wakeword, the voice activated electronic device may begin sending audio data representing locally captured sounds to the backend system.

A sound controlled electronic device may also correspond to a sound activated electronic device that may be triggered by a non-verbal sound. For example, the sound of a door opening, an alarm going off, glass breaking, a telephone ringing, or any other sound may alternatively be used to activate a sound activated electronic device. In this particular scenario, detection of a non-verbal sound may occur in a substantially similar manner as that of a verbal wakeword for a voice activated electronic device. For example, the sound of a door opening, when detected, may activate the sound activated electronic device, which may in turn cause the backend system to activate a burglar alarm.

In some embodiments, the first electronic device, or requesting device, may, alternatively, correspond to a manually activated electronic device. A manually activated electronic device, as described herein, may correspond to a device to that is capable of being activated in response to a manual input from an individual (e.g., pressing a button, touching a portion of touch screen, performing an action on a device, etc.). For instance, in response to the manual input, the manually activated electronic device may begin recording local audio captured by one or more microphones, and may send audio data representing the local audio to the backend system. For example, a tap-to-talk electronic device is on type of manually activated electronic device. Such tap-to-talk electronic devices, for instance, are capable of obtaining and outputting audio data in response to a button being pressed by an individual. In some embodiments, an individual may activate their manually activated electronic device (e.g., by pressing a button), and may utter a request for a media item to be played on a second electronic device. For example, an individual may press a button on their manually activated electronic device, and may say "Play 'May Song' on my TV." The manually activated electronic device may then send audio data representing the utterance to a backend system, which in turn may access the media item, and may determine an audio message to be played indicating that the media item is being output on the second electronic device (e.g., target device). In some embodiments, the backend system may be further configured to cause the manually activated electronic device to continue capturing local audio for a predefined temporal duration in order to determine whether or not the audio message, which is to be output by the target electronic device, is detected by the manually activated electronic device, without need for additional manual activation.

FIG. 1 is an illustrative diagram of a system for determining, using a voice activated electronic device, whether another electronic device outputs an audio message, in accordance with various embodiments. In a non-limiting exemplary embodiment, an individual 2 may speak an utterance 4, which may include a wakeword subsequently followed by an invocation. For example, utterance 4 may be, "Alexa—Play 'My Song' on my TV." In some embodiments, an electronic device 10 may be a sound controlled electronic device, such as a voice activated electronic device that is capable of detecting the wakeword (e.g., "Alexa") within utterance 4. In this particular scenario, electronic device 10 may begin sending first audio data 14 representing utterance 4 to a backend system 100. In some embodiments, however, electronic device 10 may a manually activated electronic device, capable detecting a manual input, and recording audio detected after the manual input. In this particular scenario, the manually activated electronic device may send first audio data 14 representing the recorded audio (e.g., utterance 4) to backend system 100. In some embodiments, one or more pieces of additional data, such as a time and/or date that utterance 4 was spoken or detected by electronic device 10, a location of electronic device 10, an IP address associated with electronic device 10, a device type of electronic device 10, a customer identifier associated with electronic device 10, or any other information, or any combination thereof, may be sent to backend system 100 along with first audio data 14.

First audio data 14 may be transmitted over a network, such as the Internet, to backend system 100 using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between electronic device 10 and backend system 100. In some embodiments, electronic device 10 and backend system 100 may communicate with one another via a web browser using HTTP. Various additional communication protocols may be used to facilitate communications between electronic device 10 and backend system 100 including, but not limited to, Wi-Fi (e.g., 802.11 protocol), Bluetooth®, Wi-Fi Direct, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Backend system 100 may include one or more processors, databases, and/or servers, each in communication with one another and/or electronic device 10. Each processor, database, and/or server of backend system 100 may be capable of storing, retrieving, processing, analyzing, and/or generating data to be provided to electronic devices 10, and/or to one or more additional devices. For example, backend system 100 may include one or more game servers for storing and processing information related to one or more different games (e.g., "Simon Says," karaoke, etc.). As another example, backend system 100 may include one or more weather servers for storing weather information and/or providing weather information to electronic device 10.

Backend system 100 may, in some embodiments, correspond to a collection of servers located within a remote facility, and individuals may store data on backend system 100 and/or communicate with backend system 100 using one or more of the aforementioned communications protocols.

Upon receiving first audio data 14, backend system 100 may generate first text data representing utterance 4, and may determine an intent of utterance 4 from the generated first text data. For example, backend system 100 may determine that individual 2 requested that content, such as a song entitled "My Song," be output by a television 20. In some embodiments, backend system 100 may, in addition to, or from, first audio data 14, receive a customer identifier from electronic device 10. The customer identifier may be used to determine a user account on backend system 100 that electronic device 10, and thus individual 2, is associated with. For example, backend system 100 may determine that electronic device 10 is associated a user account for individual 2 based on a customer identifier received with audio data 14. The customer identifier may correspond to any suitable identifier, such as one or more numbers, letters, or characters, (e.g., ABCD1234), for example, however persons of ordinary skill in the art will recognize that any suitable identifier may be used.

Backend system 100 may also determine that another electronic device, such as television 20, is also associated with the user account. In some embodiments, backend system 100 may determine that television 20 may be capable of outputting content, such as a song and/or video. For example, backend system 100 may determine that an intent of utterance 4 was for a particular song (e.g., "My Song") to be played on "my TV." Therefore, backend system 100 may determine whether there are any additional electronic devices associated with the user account. For example, one or more additional electronic devices, such as televisions or speakers, may also be associated with the user account of individual 2. In response to determining that utterance 4 included the words, "My TV," backend system 100 may determine which device(s) associated with the user account likely correspond to a television, and may select one of the devices with which to send the requested content to. For example, backend system 100 may determine that a particular electronic device associated with the user account is a television, and therefore may determine an IP address of that device with which to send content to be output. In some embodiments, the user account may include predefined rules for which devices to use to output content. For example, an individual may specify that a particular device (e.g., television 20) is to be used to output any content that was requested to be output by an utterance received by electronic device 10.

Still further, backend system 100 may determine that the requested content (e.g., an audio file of, point to an audio file of, or a URL for streaming, the song "My Song") is accessible for the user account. For example, backend system 100 may access a list of music accessible by the user account of individual 2, and may determine that the requested song is included within the list. If, however, backend system 100 determines that the content is not stored within the user account, backend system 100 may attempt to access the content through one or more applications that the user account has permissions for. For example, backend system 100 may access a music streaming application that includes the song, "My Song," such that the music streaming application is used to provide television 20 with a URL to the song so that television 20 may output the song.

After determining that the user account associated with the requesting device, (e.g., electronic device 10) is capable of accessing the desired content, backend system 100 may determine an audio message 8 to be played by a target electronic device (e.g., television 20), to indicate that the content is being output by the target device. For example, backend system 100 may determine that audio message 8 should say, "Playing 'My Song'." Audio message 8, in general, may allow individual 2 to "hear" whether television 20 is in an appropriate mode, or configured properly, to output the desired content based on whether or not audio message 8 is, in fact, output thereby. If not, then individual 2 may take one or more appropriate actions to cause television 20 to be configured to output content (e.g., power television 20 on, unmute television 20, etc.).

In some embodiments, backend system 100 may determine a speech endpoint of utterance 4 based on audio data 14. Upon determining the speech endpoint, backend system 100 may determine whether or not to continue receiving audio data from electronic device 10. For instance, backend system 100 may keep a communications channel between electronic device 10 and backend system 100 open such that backend system 100 may continue receiving audio data of additional sounds captured by electronic device 10. However, backend system 100 may, alternatively, close the communications channel, and may then reopen the communications channel upon sending audio data 12 representing message 8 to television 20.

In some embodiments, backend system 100 may generate second text data representing another audio message for electronic device 10. For example, backend system 100 may determine an audio message saying, "Playing 'My Song' on your TV," for electronic device 10. Backend system 100 may then generate text data representing this audio message, and may generate audio data representing this text data by executing text-to-speech functionality on the text data. While techniques for transcribing text into speech are well known in the art and need not be described in further detail herein, any suitable computer implemented text to speech technique may be used to convert the text into speech, such as SOFTSOUND speech processing technologies available from the Autonomy Corporation, which is headquartered in Cambridge, England, United Kingdom.

In some embodiments, backend system 100 may generate second audio data 12 representing audio message 8, as well third audio data 16 represents another audio message. Second audio data 12 may then be sent to television 20 along with the requested content (e.g., a pointer to an audio file of "My Song" or a URL for streaming "My Song"), along with an instruction to output audio message 8 and then the content on television 20. Furthermore, backend system 100 may send third audio data 18 to electronic device 10, while continuing to receive fourth audio data 16 representing local audio captured by one or more microphones of electronic device 10.

In one illustrative embodiment, backend system 100 may receive fourth audio data 16, and may generate third text data representing fourth audio data 16 by executing speech-to-text functionality thereon. While techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. In some embodiments, one or more filters may be applied to the received audio data to reduce or minimize extraneous noise, however this is not required.

The generated third text data may then be compared with the second text data representing audio message 8. A similarity value may be determined that indicates how similar the second text data and the third text data, and therefore audio message 8 and the audio captured by electronic device 10, are to one another. In some embodiments, a determination may be made as to whether or not the similarity value is greater than a predefined similarity threshold value. The predefined similarity threshold value may, for instance, be user adjustable, such that an individual operating electronic device 10 (e.g., individual 2) may set the threshold with which two sets of audio have to be to one another to determine that they match. However, the predefined similarity threshold value may also be set and/or adjusted by backend system 100.

If the similarity value is determined to be greater than the predefined similarity threshold value, then that may indicate that the audio captured by electronic device 10 corresponded to audio message 8, which was likely output by television 20. If the similarity value is, however, less than or equal to the predefined similarity threshold value, then that may indicate that the audio captured by electronic device 10 did not include audio message 8. Therefore, television 20 likely did not output audio message 8 (e.g., television 20 is muted such that audio message 8 was played but no sound of audio message 8 was output from television 20). In this particular scenario, backend system 100 may then cause electronic device 10 to output the other audio message represented by audio data 18. Therefore, electronic device 10 may output the other audio message, informing individual 2 that the requested content is available to play, or is attempting to be played, by television 20. Furthermore, if the similarity value is determined to be less than or equal to the predefined similarity threshold value, this may indicate that television 20 may need to be powered on, unmuted, have its input mode changed, or configured in any suitable manner such the requested content may be output thereby.

In some embodiments, backend system 100 may perform exemplary process 150 thereon. Process 150 may begin at step 152, where first audio data may be generated. In some embodiments, the first audio data may represent text data that is generated to represent a first response. For example, the first response may correspond to audio message 8 to be output by a target device, such as television 20. At step 154, second audio data may be generated. In some embodiments, the second audio data may represent text data generated to represent a second response. The second response may, for instance, correspond to a message that is to be output by a requesting device, such as electronic device 10, if the intended target device (e.g., television 20) does not output audio message 8. As an illustrative example, the first audio data may correspond to a first response, "Playing 'My Song'," while the second responsive audio data may correspond to a second response, "Playing 'My Song' on your TV." Therefore, in this particular scenario, the responses played by either television 20 or electronic device 10, respectively, may differ. In some embodiments, however, the first audio data and the second audio data may be substantially similar such that a similar response message may be output by either the requesting device or the target device. Furthermore, in some embodiments, the second audio data may not be generated until after it is determined that the target device (e.g., television 20) likely did not output, or is not configured properly to output, the response message (e.g., message 8).

At step 156, a location of the requested content, such as an audio file of the song "My Song," may be determined. In some embodiments, backend system 100 may generate a pointer to an audio file representing the requested content on backend system 100, or backend system 100 may generate a URL that, when accessed, allows the content to be output. In some embodiments, however, backend system 100 may obtain the requested content (e.g., an audio file of the song, "My Song"), and may send the obtained content to the target device. Backend system 100 may determine that the user account associated with electronic device 10 is authorized to access the requested content. For example, individual 2 may have a user account registered on backend system 100, and the user account individual 2 may have the audio file of the song, "My Song," stored. Thus, when backend system 100 attempts to obtain the audio file of "My Song," it may do so using the user account's music library. If the user account is authorized to access the audio file, then backend system 100 may generate, in one embodiment, a point to the audio file stored on backend system 100 or a URL allowing the audio file to be streamed to the target device. However, if the user account associated with individual 2 does not have authorization to the content, backend system 100 may access one or more applications (e.g., music streaming applications or providers) to provide the content to the target device, or allow individual 2 to have the option to purchase the content.

At step 158, the first responsive audio data may be sent to the second device. For example, backend system 100 may send audio data 12 to television 20 (e.g., a target electronic device). In some embodiments, a first instruction may also be sent to electronic device 10 that causes electronic device 10 to continue sending audio data 16 representing locally captured sounds. Electronic device 10 may continually capture audio using one or more microphones located thereon, and may send audio data 16 of the captured audio to backend system 100 until instructed otherwise.

At step 160, backend system 100 may receive third audio data representing the audio captured by the first device. For example, in response to sending audio data 12 representing audio message 8 to television 20, backend system 100 may send audio data 16 representing that locally captured audio to backend system 100. Therefore, electronic device 10 may be capable of "listening" for audio message 8 to be output by television 20. At step 162, first text data representing the third audio data may be generated.

At step 164, a similarity value of the first text data as compared to text data representing the first response sent to the second device may be determined. For example, determination may be made as to whether the first text data matches text data representing audio message 8, which was sent to television 20. Backend system may compare the text data of audio message 8 with the first text data representing audio data 16 of the audio captured by electronic device 10. In some embodiments, a similarity value may be determined indicating how similar the first text data and the text data representing message 8, and therefore the audio received by electronic device 10 and audio message 8, are to one another.

At step 166, a determination may be made as to whether or not the similarity value is greater than a predefined similarity threshold value. If the similarity value exceeds the predefined similarity threshold value, then process 150 may proceed to step 170. At step 170, URL may be generated for the requested content. At step 172, the URL may be sent from backend system 100 to the second device. The URL may enable the target device (e.g., television 20) to stream and output the content thereon. For example, if the content is the song, "My Song," then the URL may allow the song to be streamed to television 20, and output by one or more speakers of television 20. However, if the similarity value is determined to be less than the predefined similarity threshold value, then process 150 may proceed to step 168. At step 168, the second audio data may be sent to the first device (e.g., electronic device 10) such that a second response message may be output by the first device. For example, the second response message may indicate to individual 2 that message 8 was not detected, and therefore television 20 may not be powered on, may be muted, may have its volume settings too low to be "heard" by electronic device 10, or may be configured in a mode unable to output content.

Figure 2:
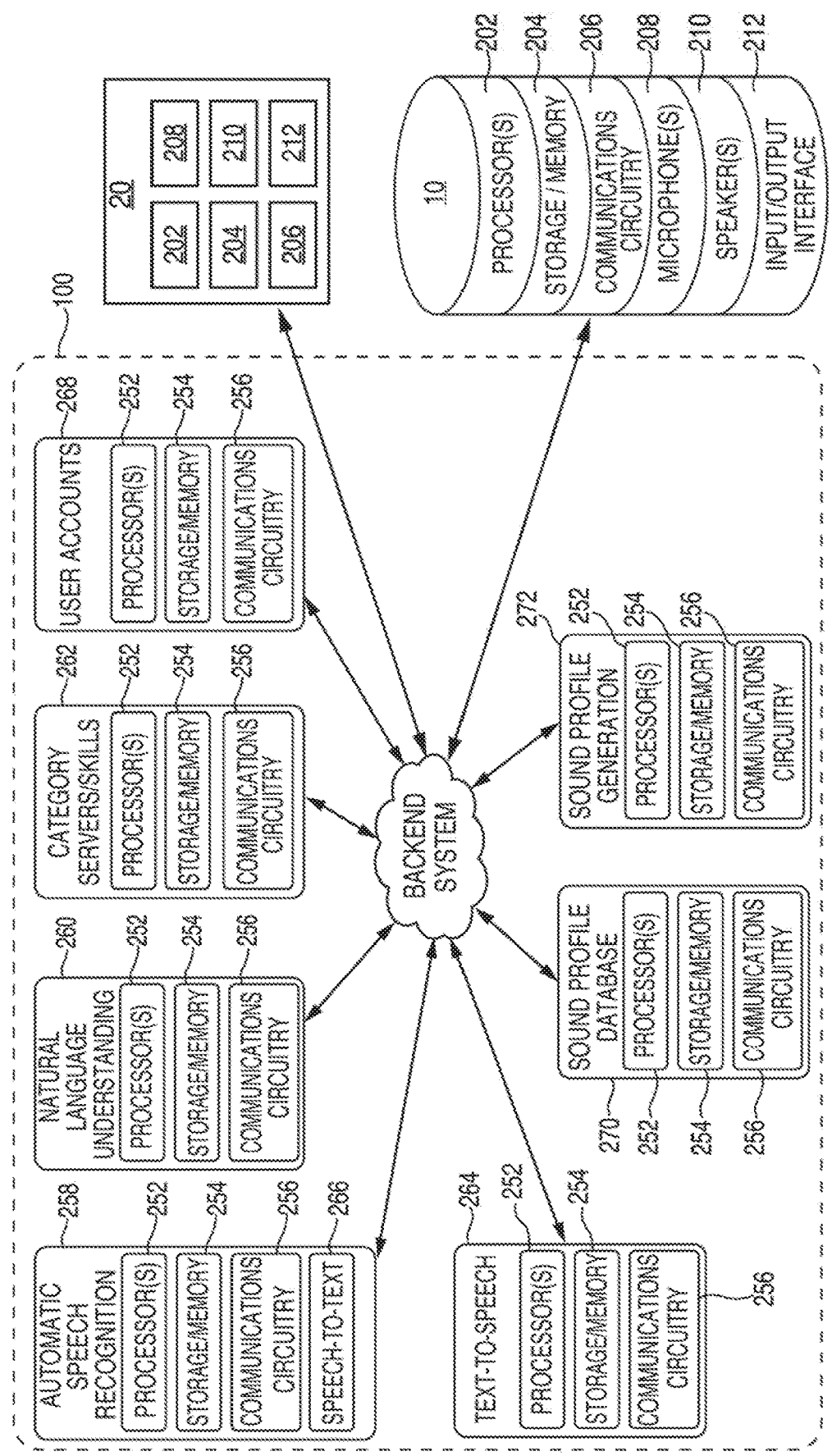
FIG. 2 is an illustrative diagram of a portion of the system architecture of FIG. 1, in accordance with various embodiments.

FIG. 2 is an illustrative diagram of a portion of the system architecture of FIG. 1, in accordance with various embodiments. Electronic device 10, in some embodiments, may correspond to any type of electronic device capable of being activated in response to detecting a specific sound, such as a voice activated electronic device. After detecting a specific sound (e.g., a wakeword or trigger), electronic device 10 may, in some embodiments, recognize commands (e.g., audible commands, inputs) within captured audio, and may perform one or more actions in response to the received commands. Electronic device 10 may correspond to any suitable type of electronic device including, but are not limited to, desktop computers, mobile computers (e.g., laptops, ultrabooks), mobile phones, smart phones, tablets, televisions, set top boxes, smart televisions, watches, bracelets, display screens, personal digital assistants ("PDAs"), smart furniture, smart household devices, smart vehicles, smart transportation devices, and/or smart accessories. In some embodiments, electronic device 10 may be relatively simple or basic in structure such that no mechanical input option(s) (e.g., keyboard, mouse, track pad) or touch input(s) (e.g., touchscreen, buttons) may be provided. For example, electronic device 10 may be a voice activated electronic device, and may be able to receive and output audio, and may include power, processing capabilities, storage/memory capabilities, and communication capabilities. However, in some embodiments, electronic device 10 may include one or more mechanical input options and or touch input components.

Electronic device 10 may, in an illustrative non-limiting embodiment, include a minimal number of input mechanisms, such as a power on/off switch. However primary functionality, in one embodiment, of electronic device 10 may solely be through audio input and audio output. For example, electronic device 10 may listen for a wakeword by continually monitoring local audio. In response to the wakeword being detected, electronic device 10 may establish a connection with backend system 100, send audio data to backend system 100, and await/receive a response from backend system 100.

In some embodiments, however, electronic device 10 may correspond to a manually activated electronic device. In response to detecting a manually input, electronic device 10 may also communicate with backend system 100 (e.g., push-to-talk devices). For example, in response to pressing and holding a button, tapping a button or touch screen, or providing any other suitable manual input, electronic device 10 may be configured to record audio. Furthermore, electronic device 10 may also be configured to establish a connection with backend system 100, send audio data representing the recorded audio to backend system 100, and await/receive a response from backend system 100.

Electronic device 10 may include one or more processors 202, storage/memory 204, communications circuitry 206, one or more microphones 208 or other audio input devices (e.g., transducers), one or more speakers 210 or other audio output devices, as well as an optional input/output ("I/O") interface 212. However, one or more additional components may be included within electronic device 10, and/or one or more components may be omitted. For example, electronic device 10 may include a power supply or a bus connector. As another example, electronic device 10 may not include an I/O interface (e.g., I/O interface 212). Furthermore, while multiple instances of one or more components may be included within electronic device 10, for simplicity only one of each component has been shown.

Processor(s) 202 may include any suitable processing circuitry capable of controlling operations and functionality of electronic device 10, as well as facilitating communications between various components within electronic device 10. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("AS SPs"), system-on-chip systems ("SOCs"), and/or complex programmable logic devices ("CPLDs"). Furthermore, each of processor(s) 202 may include its own local memory, which may store program modules, program data, and/or one or more operating systems. However, processor(s) 202 may run an operating system ("OS") for electronic device 10, and/or one or more firmware applications, media applications, and/or applications resident thereon.

Storage/memory 204 may include one or more types of storage mediums such as any volatile or non-volatile memory, or any removable or non-removable memory implemented in any suitable manner to store data on electronic device 10. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include one or more modules and/or databases, such as a speech recognition module, a wakeword database, a sound profile database, and a wakeword detection module. The speech recognition module may, for example, include an automatic speech recognition ("ASR") component that recognizes human speech in detected audio. The speech recognition module may also include a natural language understanding ("NLU") component that determines user intent based on the detected audio. Also included within the speech recognition module may be a text-to-speech ("TTS") component capable of converting text to speech to be outputted by speaker(s) 210, and/or a speech-to-text ("STT") component capable of converting received audio signals into text to be sent to backend system 100 for processing.

The wakeword database may be a database stored locally on electronic device 10 that includes a list of a current wakeword for electronic device 10, as well as one or more previously used, or alternative, wakewords for electronic device 10. In some embodiments, an individual may set or program a wakeword for electronic device 10. The wakeword may be programmed directly on electronic device 10, or a wakeword or words may be set by the individual via a backend system application that is in communication with backend system 100. For example, an individual may use their mobile device having the backend system application running thereon to set the wakeword. The specific wakeword may then be communicated from the mobile device to backend system 100, which in turn may send/notify their voice activated electronic device (e.g., electronic device 10) of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of a video or of audio may be stored within the sound profile database of storage/memory 204 on electronic device 10. In this way, if a particular sound (e.g., a wakeword or phrase) is detected by electronic device 10, a corresponding command or request may be ignored, for example. A sound profile, for example, may correspond to a frequency and temporal decomposition of a particular audio file or audio portion of any media file, such as an audio fingerprint or spectral representation.

The wakeword detection module may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 10 may then begin transmitting the audio signal to backend system 100 for detecting and responds to subsequent utterances made by an individual.

Communications circuitry 206 may include any circuitry allowing or enabling electronic device 10 to communicate with one or more devices, servers, and/or systems. For example, communications circuitry 206 may facilitate communications between electronic device 10 and backend system 100, and/or between electronic device 10 and one or more additional electronic devices (e.g., television 20). Communications circuitry 206 may use any communications protocol, such as any of the previously mentioned exemplary communications protocols. In some embodiments, electronic device 10 may include an antenna to facilitate wireless communications with a network using various wireless technologies (e.g., Wi-Fi, Bluetooth®, radiofrequency, etc.). In yet another embodiment, electronic device 10 may include one or more universal serial bus ("USB") ports, one or more Ethernet or broadband ports, and/or any other type of hardwire access port so that communications circuitry 206 allows electronic device 10 to communicate with one or more communications networks.

Electronic device 10 may also include one or more microphones 208 and/or transducers. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device 10 may include multiple microphones (e.g., four, seven, ten, etc.) placed at various positions about electronic device 10 to monitor/capture any audio outputted in the environment where electronic device 10 is located. The various microphones 208 may include some microphones optimized for distant sounds (e.g., far-field microphones), while some microphones may be optimized for sounds occurring within a close range of electronic device 10.

Electronic device 10 may further include one or more speakers 210. Speaker(s) 210 may correspond to any suitable mechanism for outputting audio signals. For example, speaker(s) 210 may include one or more speaker units, transducers, arrays of speakers, and/or arrays of transducers that may be capable of broadcasting audio signals and or audio content to a surrounding area where electronic device 10 may be located. In some embodiments, speaker(s) 210 may include headphones or ear buds, which may be wirelessly wired, or hard-wired, to electronic device 10, that may be capable of broadcasting audio directly to an individual.

In some embodiments, one or more microphones 208 may serve as input devices to receive audio inputs, such as audio message 8 from television 20. Electronic device 10, in the previously mentioned embodiment, may then also include one or more speakers 210 to output audible responses or follow-up statements. In this manner, electronic device 10 may function solely through speech or audio, without the use or need for any input mechanisms or displays.

In one exemplary embodiment, electronic device 10 includes I/O interface 212. The input portion of I/O interface 212 may correspond to any suitable mechanism for receiving inputs from an individual operating electronic device 10. For example, a camera, keyboard, mouse, joystick, or external controller may be used as an input mechanism for I/O interface 212. The output portion of I/O interface 212 may correspond to any suitable mechanism for generating outputs from electronic device 10. For example, one or more displays may be used as an output mechanism for I/O interface 212. As another example, one or more lights, light emitting diodes ("LEDs"), or other visual indicator(s) may be used to output signals via I/O interface 212 of electronic device 10. In some embodiments, one or more vibrating mechanisms or other haptic features may be included with I/O interface 212 to provide a haptic response to an individual from electronic device 10. Persons of ordinary skill in the art will recognize that, in some embodiments, one or more features of I/O interface 212 may be included in a purely voice activated version of electronic device 10. For example, one or more LED lights may be included on a voice activated electronic device such that, when microphone(s) 208 receive audio, the one or more LED lights become illuminated signifying that audio has been received by the voice activated electronic device. In some embodiments, I/O interface 212 may include a display screen and/or touch screen, which may be any size and/or shape and may be located at any portion of electronic device 10. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

Backend system 100 may include various components and modules including, but not limited to, automatic speech recognition ("ASR") module 258, natural language understanding ("NLU") module 260, category servers/skills module 262, text-to-speech ("TTS") module 264, user accounts module 268, sound profile database 270, and sound profile generation module 272. In some embodiments, backend system 100 may also include computer readable media, including, but not limited to, flash memory, random access memory ("RAM"), and/or read-only memory ("ROM"). Backend system 100 may also include various modules that store software, hardware, logic, instructions, and/or commands for backend system 100, such as a speaker identification ("ID") module, or any other module, or any combination thereof.

ASR module 258 may be configured to recognize human speech in detected audio, such as audio captured by electronic device 10, which may then be transmitted to backend system 100. ASR module 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. Furthermore, in some embodiments, ASR module 258 may include speech-to-text ("STT") module 266. STT module 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR module 258 may include an expression detector that analyzes audio signals received by backend system 100, such as the expression detector mentioned above with regards to electronic device 10. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword or phrase, is represented within the audio signal. The expression detector may then compare that score to a threshold value to determine whether the wakeword or phrase will be declared as having been spoken.

NLU module 260 may be configured such that it determines user intent based on the received audio. For example, NLU module 260 may determine that the intent of utterance 4 is for a particular song to be played on another electronic device (e.g., television 20). In response to determining the intent of utterance 4, NLU module 260 may communicate the received command to an appropriate subject matter server or skill on category servers/skills module 262 to perform one or more tasks, and/or retrieve an appropriate response or response information. NLU module 260 may include processor(s) 252, storage/memory 254, and communications circuitry 256 which, in one embodiment, may be substantially similar to processor(s) 202, storage/memory 204, and communications circuitry 206 of electronic device 200, and the previous description may apply.

Category servers/skills module 262 may, for example, correspond to various action specific applications, skills, or servers, which are capable of processing various task specific actions. Category servers/skills module 262 may further correspond to first party applications and/or third party applications capable of performing various tasks or actions. For example, based on the context of the audio received from electronic device 10, backend system 100 may use a certain application to generate a response, or to obtain response information, which in turn may be communicated back to electronic device 10 and/or to another electronic device (e.g., television 20). For instance, utterance 4 may ask a particular song to be played on another electronic device, and therefore category servers/skills module 262 may access a music streaming application capable of providing an audio file, or a URL to a website, for the song such that the other electronic device may play the song thereon. Category servers/skills module 262 may also include processor(s) 252, storage/memory 254, and communications circuitry 256.

TTS module 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS module 264 may also include processor(s) 252, storage/memory 254, and communications circuitry 256.

User accounts module 268 may store one or more user profiles corresponding to users having a registered account on backend system 100. For example, a parent may have a registered account on backend system 100, and each of the parent's children may have their own user profile registered under the parent's registered account. Information, settings, and/or preferences, for example, for each user profile may be stored within a user profile database. In some embodiments, user accounts module 268 may store a voice signal, such as voice biometric information, for a specific user profile. This may allow speaker identification techniques to be used to match a voice to voice biometric data associated with a specific user profile. In some embodiments, user accounts module 268 may store a telephone number assigned to a particular user profile. In some embodiments, user accounts module 268 may include a list of media items currently stored within an individual's registered account or user profile. For example, a list of music or videos purchased or obtained by an individual may be stored within the individual's user profile on user accounts module 268, which may be accessed by the individual when the individual seeks to hear a particular song or songs, or view a particular video or videos.

In some embodiments, user account information, such as a customer identifier (e.g., a serial number, device identification number or string, and/or a MAC address), may be received by backend system 100 along with audio data representing an utterance (e.g., utterance 4) from electronic device 10. Upon receiving the customer identifier, backend system 100 may identify a particular user account on user accounts module 268 that is associated with that customer identifier. For example, electronic device 10 may send audio data 14 including a customer identifier associated with electronic device 10. The customer identifier may be associated with a user account registered to individual 2 on backend system 100. Therefore, backend system 100 may be able to identify the user account of individual 2, or more particularly corresponding to electronic device 10, using the customer identifier.

Each user account on user accounts module 268 may store information regarding content available for access by one or more electronic devices associated with the user account. For example, an individual may purchase one or more songs on backend system 100 via their user account, and therefore may listen to those songs using electronic device 10. If a request is received to for content, then backend system 100 may first determine, using user accounts module 268, if the requesting device has permission, or is authorized, to access that content. If not, backend system 100 may provide the requesting device with one or more options to buy, or otherwise gain access to, the content. If, however, the requesting device does have permission to access the particular content, then, in one embodiment, backend system 100 may generate a pointer to the content stored on backend system 100, and may send that pointer to a particular target device to output the content. In another embodiment, backend system 100 may generate a URL that allows the content to be streamed to a target device, and may send that URL to the target device. Upon receiving the URL, the target device may access the URL, and may begin buffering the content and playing the buffered content thereon. Persons of ordinary skill in the art will recognize that although the aforementioned description corresponded to any suitable content, such as an audio file of a song.

In some embodiments, user accounts module 268 may further include information as to which devices associated with the user account are to be used as output devices. For example, an individual may set a particular device, such as television 20, as being an output device for any content requested by electronic device 10. In this particular scenario, for any utterance received by electronic device 10 that requests that content be output, backend system 100 may route that content, at least initially, to a selected output device, such as television 20. In some embodiments, however, backend system 100 may determine an appropriate device to output the requested content based on the types of devices that are associated with a particular user account. For example, if the requested content is a video, then backend system 100 may determine that, because electronic device 10 may only be able to output audio while television 20 may be able to output video, the requested content should be sent to television 20 for being output.

Sound profile database 270 may store sound profiles corresponding to various words, phrases, or sounds that, if determined to be present within received audio data, may cause a specific action to occur. For example, a sound profile may be stored within sound profile database 270 of a word or phrase that, when detected, may indicate to backend system 100 that a corresponding command is to be ignored. A sound profile for a word or phrase may, in one embodiment, correspond to a spectrogram breakdown of that word or phrase, which indicates, for a finite time interval, an amplitude or intensity of each frequency within that word or phrase. For each maximum intensity level, a simplified two-dimensional spectrogram may be created that plots an intensity value for various temporal and frequency values. To index these points, one or more points within the spectrogram are mapped to one another using hashes. Anchor points within the spectrogram are selected, and the aggregate of the frequency with which the anchor point is located, the frequency of which a target point is located, a temporal difference between the target zone point and the anchor point, and a time of anchor point, may be found. Thus, each hash is stored within the sound profile database for a particular word or phrase's sound profile.

When audio data is received from voice activated electronic device 10, a sound profile of that audio data may be generated, and a sound profile similarity value may also be determined for the generated sound profile and one or more sound profiles of the words or phrases stored within storage/memory 254 of sound profile database 270. If the generated sound profile similarity value is greater than a predefined sound profile similarity threshold value, then the two sound profiles may be said to correspond to similar audio, and sound profile database 270 may provide an instruction to ASR module 258 to stop any remaining speech recognition processing, or to prevent any further analysis or processing of the audio data to occur, or to otherwise ignore the audio data. Although sound profile database 270 is shown as a separate component within backend system 100, persons of ordinary skill in the art will recognize that this is merely exemplary. For example, sound profile database 270, or the functionality of sound profile database 270, may additionally or alternatively be included within ASR module 258 (e.g., within storage/memory 254 of ASR module 258). As another example, sound profile database 270, or the functionality of sound profile database 270, may be implemented within any other suitable component on backend system 100. Still further, in one exemplary embodiment, sound profile database 270, and/or the functionality thereof, may be included on electronic device 10 (e.g., within storage/memory 204), as described in greater detail above. As yet another example, sound profile database 270 may be included as a separate component external to both backend system 100 and electronic device 10. In this particular scenario, sound profile database 270 may perform one or more pre-filtering functions for audio content prior to the audio data being provided from electronic device 10 to backend system 100. Furthermore, sound profile database 270 may also include processor(s) 252, storage/memory 254, and communications circuitry 256.

Sound profile generation module 272, in one embodiment, may be used to generate a sound profile, such as an audio fingerprint, of a specific audio signal or sound. The generated sound profile may be provided to, and stored within, sound profile database 270. This may enable backend system 100 to prevent unwanted speech processing to occur from certain audio. Sound profile generation, in some embodiments, may include segmenting received audio data into overlapping audio frames. The overlapping audio frames may be of any suitable temporal size. For example, each overlapping audio frame may be between approximately 200-500 milliseconds long, such as approximately 380 milliseconds long. A spectral representation may then be generated for each of the overlapping audio frames by performing a Fourier transform (e.g., a Fast Fourier Transform "FTT" or a Discrete Fourier Transform "DFT") on each audio frame. A number of frequency bands or bins, such as thirty three (33) frequency bands corresponding to a 32-bit signal, may then be selected such that the frequency bands associated with the typical Human Auditory System ("HAS") spectral range (e.g., between approximately 300 Hz and 2,000 Hz) corresponding to typical sound frequencies which are perceptible to humans. Next, a sign of the energy differences along both time and frequency is determined for each audio frame and audio frequency band. If the energy difference positive (e.g., greater than 0), then a "1"-bit, or logical true, output is generated, whereas if the energy difference is 0 or negative (e.g., less than or equal to 0), then a "0"-bit, or logical false, output is generated, as described in Equation 1 below.

$$F(n, m) = \begin{cases} 1 \text{ if } \Delta_t(n, m) > 0 \\ 0 \text{ if } \Delta_t(n, m) \leq 0 \end{cases} \quad \text{Equation 1}$$

In Equation 1, $\Delta_t(n, m) = \Delta_f(n, m) - \Delta_f(n-1, m)$, and $\Delta_f(n, m) = E(n,m) - E(n, m+1)$, and the energy of band m of frame n is represented by $E(n,m)$, while the m-th bit of the sub-fingerprint of frame n is represented by $F(n,m)$. However, persons of ordinary skill in the art will recognize that any suitable technique for generating a sound profile may be used, and the aforementioned is merely exemplary. In one embodiment, sound profile generation module 272 also includes processor(s) 252, storage/memory 254, and communications circuitry 256.

Persons of ordinary skill in the art will recognize that although each of ASR module 258, NLU module 260, category servers/skills module 262, TTS module 264, user accounts module 268, sound profile database 270, sound profile generation module 272, and request surplus protection module 274 may each include instances of processor(s) 252, storage/memory 254, and communications circuitry 256, and those instances of processor(s) 252, storage/memory 254, and communications circuitry 256 within each of ASR module 258, NLU module 260, category servers/skills module 262, TTS module 264, user accounts module 268, sound profile database 270, sound profile generation module 272, and request surplus protection module 274 may differ. For example, the structure, functionality, and style of processor(s) 252 within ASR module 258 may be substantially similar to the structure, functionality, and style of processor(s) 252 within NLU module 260, however the actual processor(s) 252 need not be the same entity.

In some embodiments, electronic device 10 may communicate with an additional electronic device, such as television 20, using backend system 100. Television 20 may, in one non-limiting embodiment, may correspond to any suitable electronic device capable of outputting video as well as audio thereon. In some embodiments, television 20 may, itself, be a sound controlled electronic device. For instance, television 20 may include voice activation functionality such that television 20 is capable of being activated by a trigger expression or wakeword. Furthermore, television 20 may also include one or more manual activation components, which enable television 20 to communicate with backend system 100 in response to a manual input. In still additional embodiments, television 20 may be in communication with one or more additional voice activated electronic devices (e.g., similar to electronic device 10), which may enable television 20 to communicate with backend system 100 through an intermediary device. For example, television 20 may be in communication (e.g., via a wireless or hard-wired connection) to another sound controlled electronic device, which in turn may be in communication with backend system 100. In response to electronic device 10 receiving a command to output content on television 20, electronic device 10 may send the command to backend system 100, which may process the command's utterance, and may send the content to the sound controlled electronic device to provide to television 20. Although electronic device 20 has been described as television 20, persons of ordinary skill in the art will recognize that electronic device 20 may alternatively correspond to any suitable electronic device capable of outputting media, such as audio and/or video. For instance, electronic device 20 may correspond to any suitable type of electronic device including, but are not limited to, desktop computers, mobile computers (e.g., laptops, ultrabooks), mobile phones, smart phones, tablets, televisions, set top boxes, smart televisions, watches, bracelets, display screens, personal digital assistants ("PDAs"), smart furniture, smart household devices, smart vehicles, smart transportation devices, and/or smart accessories.

Television 20, in some embodiments, may include one or more instances processor(s) 202, storage/memory 204, communications circuitry 206, microphone(s) 208, speaker(s) 210, and I/O interface 212, which may be substantially similar to processor(s) 202, storage/memory 204, communications circuitry 206, microphone(s) 208, speaker(s) 210, and I/O interface 212 of electronic device 10, and the previous description may apply. In some embodiments, I/O interface 212 of television 20 may include a large display capable of outputting videos thereon. Furthermore, speaker(s) 210 of television 20 may be capable of outputting audio, and/or audio portions of videos, thereon. Further still, one or more components processor(s) 202, storage/memory 204, communications circuitry 206, microphone(s) 208, speaker(s) 210, and I/O interface 212 may be omitted from television 20. For example, television 20, in some embodiments, may not include microphone(s) 208. However, in some embodiments, television 20 may include one or more additional comments.

Figure 3:
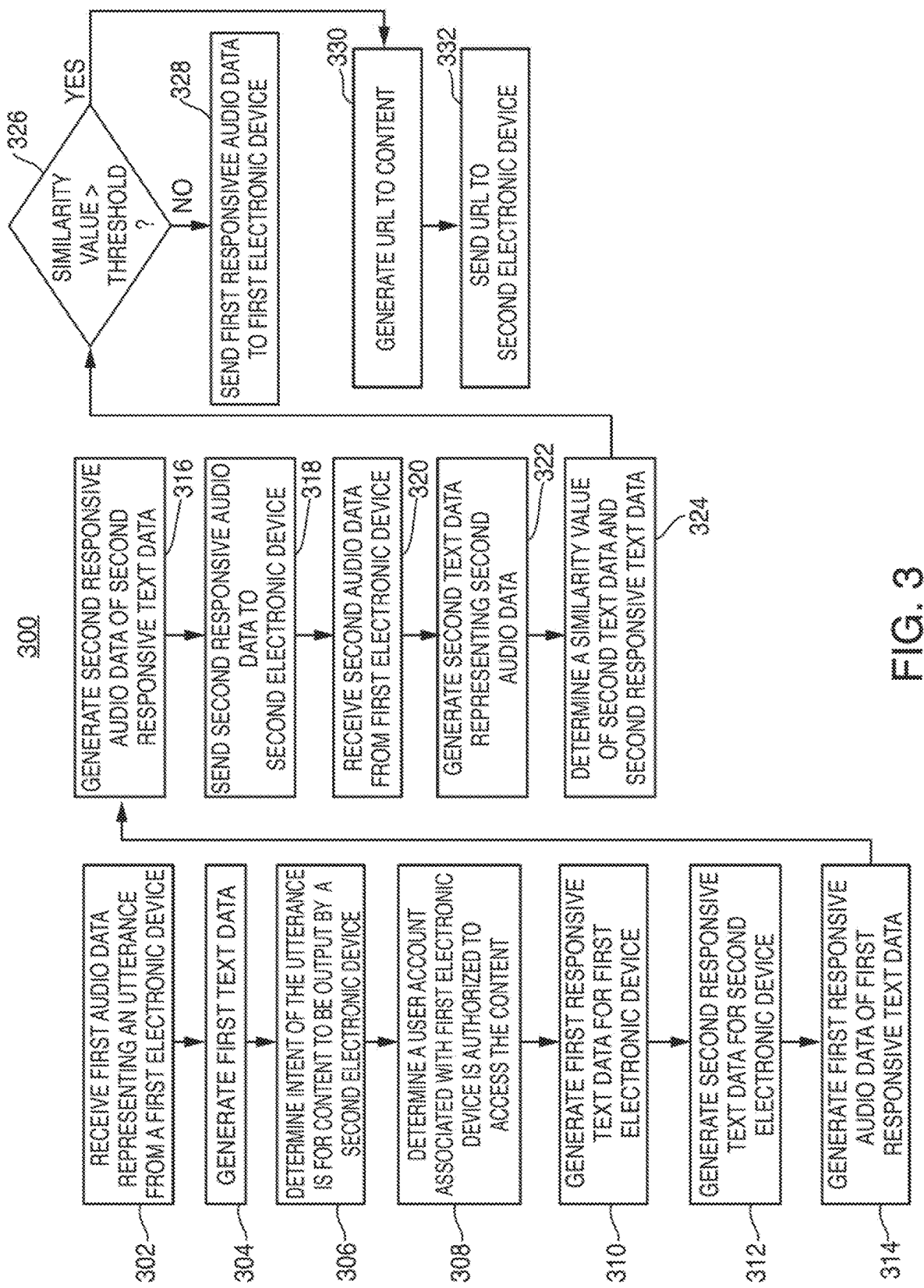
FIG. 3 is an illustrative flowchart of a process for determining whether an electronic device detects an audio message that is to be output by another electronic device, in accordance with various embodiments.

FIG. 3 is an illustrative flowchart of a process for determining whether an electronic device detects an audio message that is to be output by another electronic device, in accordance with various embodiments. Process 300 may begin at step 302. At step 302, first audio data representing an utterance may be received at a backend system from a first electronic device. For example, backend system 100 may receive audio data 14 representing utterance 4 spoken by individual 2, from electronic device 10. In some embodiments, electronic device 10 may establish a connection with backend system 100 in response to a wakeword (e.g., "Alexa") being detected within audio captured by electronic device 10. In response, electronic device 10 may send audio data 14 representing utterance 4, a portion of utterance 4 (e.g., "Play 'My Song' on my TV"), and/or audio representing a few milliseconds before the wakeword was uttered until an approximate end of utterance 4, to backend system 100. Furthermore, electronic device 10 may receive audio data 14 until a speech endpoint of utterance 4 is determined, or backend system 100 may continue to receive audio data 14 even after the speech endpoint is determined.

At step 304, first text data may be generated. For instance, audio data 14 may be provided to ASR module 258 of backend system, and STT module 266 of ASR module 258 may execute speech-to-text functionality on audio data 14 to generate text data representing utterance 4. At step 306, an intent of the utterance may be determined to be for content (e.g., a song, a video) to be output by a second electronic device. The generated first text data may, in some embodiments, be provided to NLU module 260, which may be capable of determining an intent of utterance 4 based on the generated first text data. As one example, NLU module 260 may determine that the intent of utterance 4 may be for a song, "My Song," to be played on an additional electronic device. In some embodiments, NLU module 260 may determine that the words "my TV" were included within utterance 4, and may access a user account within user accounts module 268 to determine which, if any, televisions are associated with the user account. For example, electronic device 10 may be associated with a user account of individual 2. Upon receiving audio data 14, backend system 100 may determine the particular user account associated with electronic device 10 based on a customer identifier received by backend system 100 along with audio data 14. After determining the user account currently submitting a request to backend system 100, a television that has already been associated with that user account (e.g., television 20) may be determined as the target electronic device for the song to be output on. In some embodiments, a particular device may be pre-selected to be an output device such that any requests for content to be output are automatically routed to the selected output device. For example, the user account may have television 20 listed as an output device such that any request for content to be output received by electronic device 10 causes that content to be output by television 20.

At step 308, a determination may be made that the user account associated with the first electronic device is authorized to access the content. As mentioned above, the first audio data may include a customer identifier, which may indicate a user account associated with the first electronic device that the first audio data was received from. This information may then be used to determine a user account associated with the first electronic device. After the user account is determined, backend system 100 may determine whether the user account is authorized to access the content. For example, a user account that has permission to access a particular media item may access that media item stored within memory of backend system 100 via a pointer to the media item on backend system 100, or via a URL directed to a location where the media item is stored on backend system 100. In some embodiments, backend system 100 may determine whether the user account has the media item stored within the user account. For example, an individual may store their music or videos within their user account on backend system 100. In this scenario, backend system may be able to obtain the media item, such as a song or video, from the user account. However, if the user account does not have access to the media item, then backend system 100 may access one or more category servers/skills from category servers/skills module 262, which may allow that media item to be accessed and/or purchased. For example, backend system 100 may access one or more third-party applications, such as a music streaming service, that allows an individual to listen to music that he/she may not currently own, but has a subscription to the service. In some embodiments, the user account may also include preferred content providers to use for particular content. For example, a music streaming application or service may be set as a preferred provider for streaming music, while a video streaming application or service may be set as a preferred provider for streaming videos. In some embodiments, at step 308, the content may be obtained. For example, the audio file (e.g., mp3, mp4, way, etc.) may be obtained that corresponds to the song, "My Song." However, in some embodiments, at step 308, a URL to the audio file, or to a website or application where the song may be accessed from, may be obtained.

At step 310, first responsive text data for the first electronic device may be generated. The first responsive text data may represent an audio message that may be played on the first electronic device. For example, the first audio message may be, "Playing 'My Song' on your TV." The first audio message may, therefore, notify individual 2 that the requested song is currently playing, or attempting to be played, on the requested electronic device (e.g., television 20). In some embodiments, the first audio message may be determined by backend system 100 based on utterance 4. For example, if utterance 4 is asking that a particular song be played on a particular electronic device, backend system 100 may determine an appropriate response to indicate that the song is to be played on the target device. As another example, if utterance 4 is asking for a video to be played on a television, then backend system 100 may determine that an appropriate response to indicate that the video is being played on the television. In some embodiments, step 310 may be optional, or may occur at a later time, based on whether a second message to be output by the second electronic device is detected by the first electronic device.

At step 312, second responsive text data representing a second audio message for the second electronic device may also be generated. For example, the second audio message may be, "Playing 'My Song'." In some embodiments, the second responsive text data may also represent the first audio message.

At step 314, first responsive audio data of the first responsive text data may be generated. For instance, the first responsive text data may be provided to TTS module 264, where first responsive audio data of the first responsive text data may be generated. Furthermore, at step 316, second responsive audio data may be generated of the second responsive text data. For instance, the second responsive text data may be provided to TTS module 264, where second responsive audio data of the second responsive text data may be generated. In some embodiments, the first responsive audio data may be generated for the first electronic device, and the second responsive audio data may be generated for the second electronic device, such that both the first electronic device and the second electronic device have the ability to output the first audio message and the second audio message, respectively.

At step 318, the second responsive audio data may be sent to the second electronic device. For example, the second responsive audio data corresponding to audio message 8 may be sent to television 20. In some embodiments, however, the second responsive audio data may be sent to the second electronic device prior to the media being sent to the second electronic device. Upon receiving the second responsive audio data, the second electronic device (e.g., television 20) may be configured to output audio message 8. If the second electronic device is configured properly, then audio message 8 should output, however if the second electronic device is not configured to output content (e.g., powered off, muted, etc.), then audio message 8 may not output.

At step 320, second audio data representing audio captured by the first electronic device may be received by backend system 100. For example, electronic device 10 may continue sending audio data representing sounds captured by one or microphone of electronic device 10. In some embodiments, the sounds may correspond to audio captured during a first temporal window during which time audio message 8 is expected to be output by television 20. Electronic device 10 may then send audio data representing that captured sounds to backend system 100. For example, electronic device 10 may send audio data 16 to backend system 100. In some embodiments, backend system 100 may, in response to determining a speech endpoint of utterance 4, allow electronic device 10 to continue sending audio data to be processed. However, backend system 100 may alternatively, after the speech endpoint is determined, cause electronic device 10 to stop sending any additional audio data until an instruction is generated and sent from backend system 100 to electronic device 10 which causes electronic device 10 to begin sending audio data of locally captured sounds to backend system 100 without need for the wakeword to be uttered again. At step 322, second text data representing the captured audio may be generated. For instance, upon receipt by backend system 100, the second audio data may be provided to ASR module 258, which may use STT module 266 to execute speech-to-text functionality to the second audio data, thereby generating the second text data.

At step 324, a similarity value of the second text data as compared with the second responsive text data, may be determined. The similarity value may indicate how similar the second text data and the second responsive text data, and therefore whether the second response was "heard" by the first electronic device. For example, each word of the second text data may be compared with each word of the second responsive text data. If the second text data and the second responsive text data are determined to be similar to one another, then this may indicate that the audio captured by the first electronic device likely corresponds to the audio message output by the second electronic device. However, if the second text data and the second responsive text data are not determined to be similar to one another, then this may indicate that the first electronic device did not "hear" the audio message being output by the second electronic device.

At step 326, a determination may be made as to whether the similarity value determined at step 324 is greater than a predefined similarity threshold value. The predefined similarity threshold value may be any value, and it may be adjustable by an individual operating electronic device 10. As an illustrative example, the predefined similarity threshold value may correspond to a percentage of how similar the second text data and the second responsive text data are required to be in order to declare that the second text data and the second responsive text data represent the same sound or speech. For instance, the second text data and the second responsive text data may be required to be 95% similar (e.g., only a 5% difference) in order for a match to be declared. However, persons of ordinary skill in the art will recognize that this is merely exemplary, and any suitable degree of similarity may be employed.

If, at step 326, it is determined that the similarity value is less than or equal to the predefined similarity threshold value, then process 300 may proceed to step 328. At step 328, the first response may be caused to play on the first electronic device. For example, the first responsive audio data may be sent from backend system 100 to the first electronic device. For instance, in response to electronic device 10 not detecting audio message 8, electronic device 10 may then output the first response (e.g., "Playing 'My Song' on your TV"). This may allow individual 2 to know that the media (e.g., the song, "My Song") is beginning to play on television 20, even if television 20 is not yet powered on, muted, and/or in an incorrect input mode. For instance, the song that was requested to play on television 20 by individual 2 may already begin to output the song, despite the fact that speaker(s) 208 of television 20 may not yet be powered. In some embodiments, steps 310 and 314 of process 300 may, alternatively, be performed prior to step 328 such that the first responsive text data and the first response audio data are generated in response to determining that the similarity value is less than or equal to the predefined similarity threshold value.

If, however, at step 326, it is determined that the similarity value is greater than the predefined similarity threshold value, then process 300 may proceed to step 330. At step 330, a URL may be generated for the content, and at step 332 the URL may be sent to the second electronic device. For example, if television 20 outputs audio message 8, and electronic device 10 is capable of "hearing" audio message 8, then backend system 100 may further send the requested content to television 20 to be output thereby. In some embodiments, backend system 100, in response to determining that the similarity value is greater than the predefined similarity threshold value, may cause the first electronic device (e.g., electronic device 10) to return to a keyword spotting mode where the first electronic device may continue to monitor local audio for an utterance of the wakeword.

Figure 4:
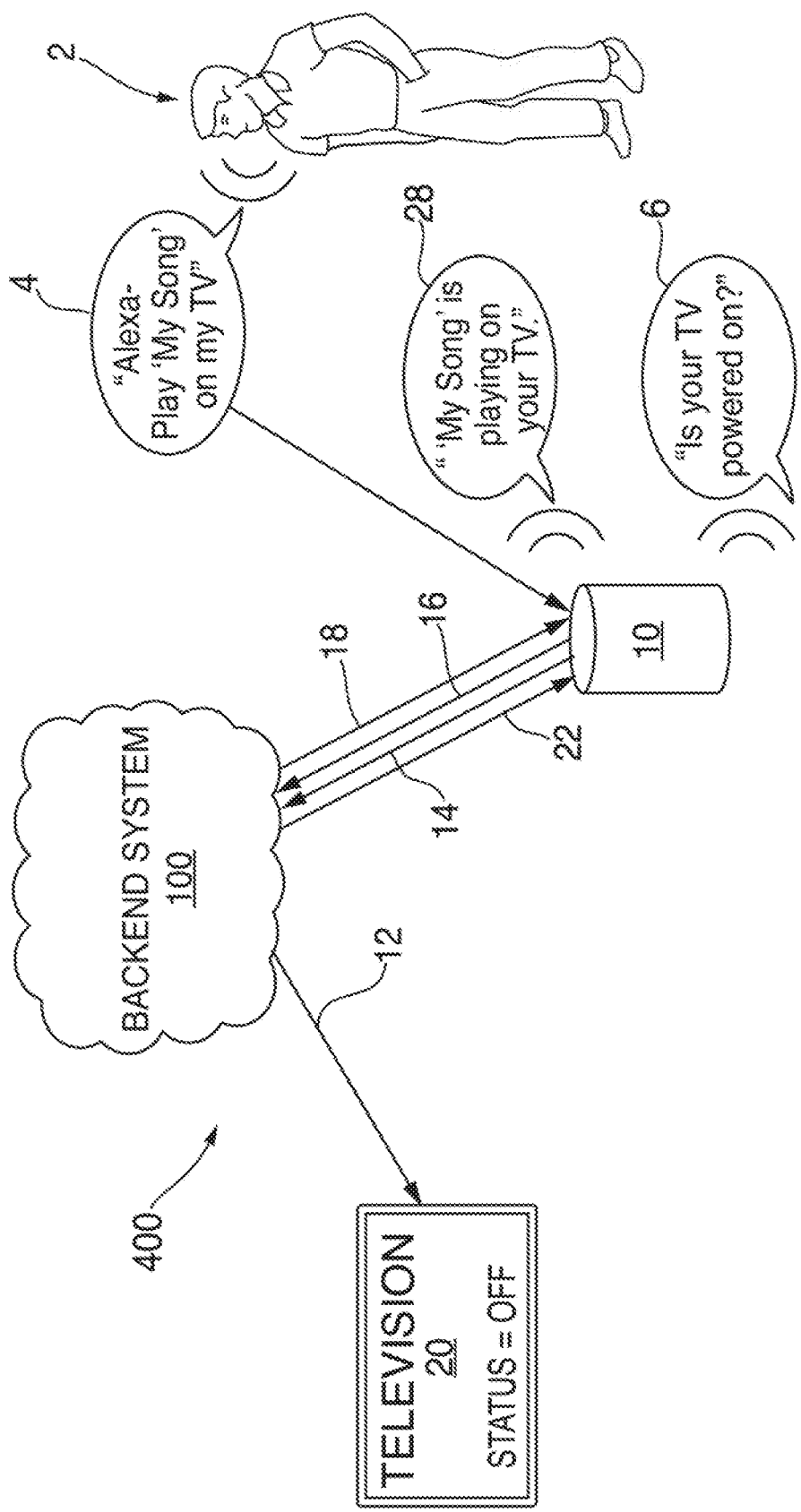
FIG. 4 is an illustrative diagram of a system for outputting an audio message on an electronic device, as well as an additional message that inquires of a status of another electronic device, in accordance with various embodiments.

FIG. 4 is an illustrative diagram of a system for outputting an audio message on an electronic device, as well as an additional message that inquires of a status of another electronic device, in accordance with various embodiments. System 400 includes electronic device 10 and television 20, each of which may communicate with backend system 100 using any of the previously mentioned communications protocols. In some embodiments, individual 2 may speak utterance 4 to electronic device 10. Utterance 4 may include a wakeword (e.g., "Alexa"), and in response to detecting the wakeword, electronic device 10 may send audio data 14 representing utterance 4 to backend system 100. Backend system 100 may determine an intent of utterance 4, which in the illustrative embodiment may correspond to a request that content, such as a song entitled "My Song," be played on another electronic device, such as television 20. In response, backend system 100 may generate a first response for television 20 that indicates that the song is playing on television 20. Backend system 100 may also send audio data 12 representing audio message 8, "Playing 'My Song'," to television 20 along with a URL directed to the audio file of the song, "My Song," on backend system 100.

In one non-limiting embodiment, television 20 may be powered off, such that minimal or no power is currently being drawn by television 20. When in a powered off state, generally referred to as "off," television 20 is not able to output audio and/or video, as speaker(s) 210 of television 20 are not receiving power. However, persons of ordinary skill in the art will recognize that television 20 may not need to be in an "off" state, and alternatively may be in a muted state (e.g., television 20 is powered on but no sound is being output), a low-volume state (e.g., television 20 is powered on and sound is being output, but a level of the output sound is too low to be detected by electronic device 10), or television 20 may be in a different input state. For the latter, television 20 may be capable of outputting media from different sources corresponding to different inputs of television 20. For instance, television 20 may include one or more High-Definition Multimedia Interfaces ("HDMI") inputs, one or more USB inputs, one or more cable inputs, one or more wireless network inputs, and/or one or more auxiliary device inputs. Content may be provided to television 20 via one of these various inputs, and an individual may cycle through the various inputs of television 20. In some embodiments, however, television 20 may only be capable of receiving content from backend system 100 via a particular input, and therefore if no media is being output by television 20, this could also correspond to television 20 being set to a different input. For example, television 20 may output media from a cable box via an HDMI input, and may output media from backend system 100 via a wireless input. If television 20 is currently in a mode where it is receiving content from the cable box, then when backend system 100 sends content to television 20, that content will not be output until television 20 is switched from using the HDMI input to using the wireless input.

As mentioned above, if television 20 is powered off, or otherwise unable to output audio/video, then audio message 8 may also not be able to be output via television 20. Electronic device 10 may continue sending audio data 16 representing sound captured after utterance 4, to backend system 100. In one embodiment, electronic device 10 may, alternatively, be instructed to capture audio detected by microphone(s) 208 during a first temporal window during which audio message 8 is expected to be output by television 20.

Electronic device 10 may send audio data 16 representing the captured sounds to backend system 100. Upon receipt, backend system 100 may generate text data representing the captured audio, and may compare the text data with text data representing audio message 8. If the text data does not match, then that indicates that audio message 8 likely was not heard by electronic device 10. In this particular scenario, backend system 100 may generate text data representing message 28, generate audio data 18 representing the generated text data, and may send audio data 18 to electronic device 10 such that audio message 28 may be output using speaker(s) 208. This may indicate to individual 2 that the requested content (e.g., the song, "My Song") is currently being output, or attempting to be output by, television 20. Therefore, if television 20 needs to be powered on, unmuted, and/or have its volume raised, for example, then individual 2 may be able to perform such a task to cause television 20 to output the media item thereon.

In some embodiments, backend system 100 may also send an additional audio message to electronic device 10 to inquire about a status of the recent request. For example, backend system 100 may send audio data 22 representing additional audio message 6, to electronic device 10. Additional audio message 6 may include an audible question, such as, for example, "Is your TV playing 'My Song'?", or "Is your TV powered on?" By sending audio data 22, backend system 100 may be able to follow-up with individual 2 to determine whether or not the target device (e.g., television 20), is in fact outputting the requested content.

In some embodiments, backend system 100 may cause electronic device 10 to continue sending additional audio captured after audio message 6 was output to backend system 100. In one embodiment, backend system 100 may, alternatively, cause electronic device 10 to send additional audio data representing sounds captured during a temporal window corresponding to after audio message 6 is to be output thereby. For example, in response to playing audio message 6, electronic device 10 may send audio data of local audio captured after audio message 6 is played, to backend system 100.

If television 20 now is outputting the media item (e.g., the song, "My Song"), then the local audio captured by electronic device 10 should include a portion of the media item. Upon receipt of this audio data, backend system 100 may provide the audio data to sound profile generation module 272. Sound profile generation module 272 may generate a sound profile of the local audio. For example, an audio fingerprint of the local audio may be generated. Backend system 100 may then compare that sound profile with a known sound profile of the song, "My Song," stored on sound profile database 270, to determine whether the detected audio is, in fact, the song, "My Song." This may enable backend system 100 to "self-check" to see if individual 2 has caused television 20 to now output the media item (e.g., by turning television 20 on or unmuting television 20). Furthermore, backend system 100 may be able to provide yet another message to electronic device 10 to ask whether or not backend system 100 should stop sending the media file to television 20, or whether backend system 100 should perform some additional task, such as sending the audio file of the song to a different electronic device (e.g., for instance, if television 20 is not working or currently in use).

Figure 5:
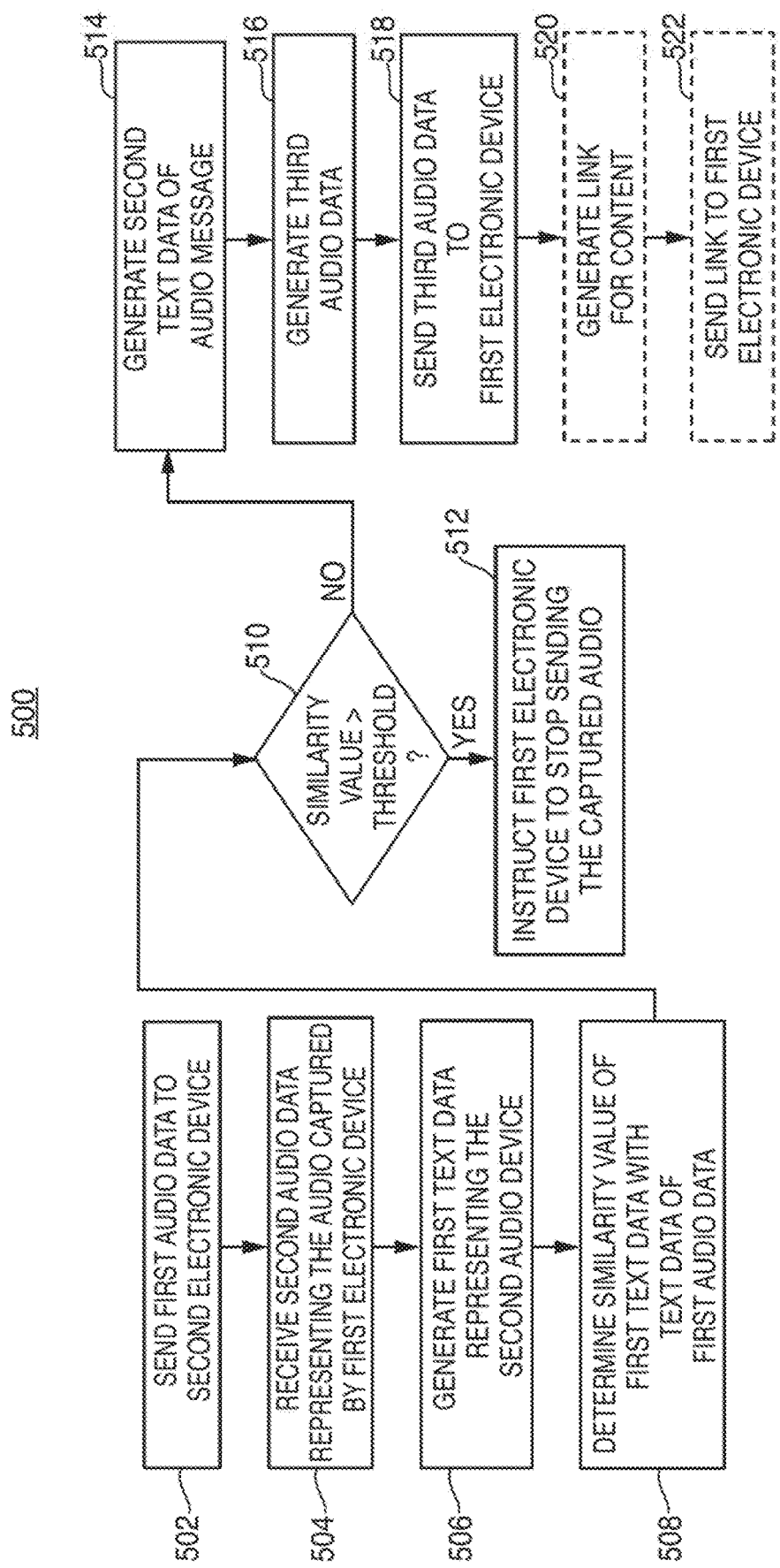
FIG. 5 is an illustrative flow chart of a process for determining whether an target device output an audio message, in accordance with various embodiments.

FIG. 5 is an illustrative flow chart of a process for determining whether an target device output an audio message, in accordance with various embodiments. Process 500, in one exemplary embodiment, may begin at step 502. At step 502, first audio data representing a first audio message may be sent to a second electronic device. For example, audio data 12 representing audio message 8 may be sent to television 20 from backend system 100. At step 504, second audio data representing local audio that was captured by the first electronic device may be received at backend system 100. For example, backend system 100 may receive audio data 16 corresponding to sounds detected by electronic device 10 after audio message 8, for instance, was to be output. Upon receipt, backend system 100 may generate text data representing the second audio data, at step 506, and may determine a similarity value of the first text data as compared to text data representing the first audio data. For example, text data representing audio data 16 may be compared to text data representing audio message 8, to determine whether or not electronic device 10 was able to hear audio message 8.

At step 508, a determination may be made as to whether the similarity value from step 506 is greater than a predefined similarity threshold value. If, at step 514, it is determined that the similarity value is greater than the predefined similarity threshold value, then process 500 may proceed to step 510, where the first electronic device is instructed to stop sending audio data representing the captured audio. For instance, because the similarity value was greater than the predefined similarity threshold value, this may indicate that electronic device 10 "heard" audio message 8, and therefore television 20 is configured to output content. Thus, in this particular scenario, the content may be routed to television 20 such that it may be output thereby. For example, URL for the content may be generated and sent to television 20 to output the content thereon.

However, if at step 510 it is determined that the similarity value is less than or equal to the predefined similarity threshold value, then process 500 may proceed to step 514. At step 514, second text data representing audio message 28 as well as audio message 6 may be generated. At step 516, third audio data representing the second text data may be generated, and at step 518, the third audio data may be sent from backend system 100 to the first electronic device. For example, electronic device 10 may not have "heard" audio message 8 being output by television 20, and therefore, in this particular scenario, electronic device 10 may output audio message 28 and audio message 6 using speaker(s) 210 of electronic device 10. In some embodiments, an additional instruction may be sent to the first electronic device that causes the first electronic device to continue sending audio data representing any additional audio that was captured after audio message 6 is output. For example, electronic device 10 may output message 28, "'My Song' is playing on your TV," followed by message 6, "Is your TV powered on?" Thus electronic device 10 may continue sending audio data to backend system representing a response spoken by individual 2 indicating whether or not their TV is turned on.

A third audio message may also be generated by backend system 100. The third message may indicate that the audio message that was intended to play on television 20 was not detected, and therefore electronic device 10 may begin to output the media item that was requested to play on television 20. For example, the third audio message may be a follow-up message, "Your TV isn't playing 'My Song.' I'll start playing it here." Persons of ordinary skill in the art will recognize that any follow-up message may be generated by backend system 100, and the aforementioned is merely exemplary. At step 520, a link for the requested content may be generated by backend system 100, and at step 522, the link may be sent to the first electronic device. This may allow the first electronic device (e.g., electronic device 10), to output the content thereon until it is determined that the intended target device (e.g., television 20) is capable of outputting the content. Furthermore, in some embodiments, steps 520 and 522 may be optional. For example, in response to not detecting audio message 8, electronic device 10 may output a follow-up message, "I don't hear 'My Song' playing on your TV. I will start playing 'My Song' here." Backend system 100 may then send the URL where an audio file of the song, "My Song," may be streamed by electronic device 10, such that electronic device 10 plays the song, "My Song," thereon.

FIG. 6 is an illustrative diagram of another system for outputting an additional audio message on an electronic device in response to another electronic device not detecting an audio message, in accordance with various embodiments. System 600, in the illustrative embodiment, may include electronic device 10, television 20, and an additional electronic device 30, each of which may communicate with backend system 100 using any number of the previously mentioned communications protocols. System 600 of FIG. 6 may be substantially similar to system 400 of FIG. 4, with the exception that in FIG. 6, electronic device 30 may be configured to capture local audio to determine whether or not television 20 output an audio message.

Individual 2 may, for instance, speak an utterance 4 to their electronic device 10 requesting content (e.g., a song entitled "My Song") be played on their corresponding television 20. In some embodiments, television 20 may be located in a separate room or in a different portion of a home than electronic device 10. For example, electronic device 10 may be located in a kitchen, while television 20 may be located in a family room. Therefore, in this particular instance, electronic device 10 may not be capable of hearing audio output by television 20, as the two devices may physically be separated from one another.

In some embodiments, electronic device 30, which may be substantially similar to electronic device 10, may be located proximate to television 20. For instance, electronic device 30 may be a sound controlled electronic device, such as a voice activated electronic device, and may be capable of monitoring local audio for utterances of a wakeword, and may be configured to detect and interpret any words that subsequently follow the detected wakeword as actionable inputs or commands. In some embodiments, electronic device 30 may further be capable of communicating the actionable inputs or commands to backend system 100, and further may be capable of receiving responses, or receiving data representing responses to utterances, which may be output by electronic device 30 and/or television 20.

Backend system 100, in the illustrative embodiment, may receive audio data 14 representing utterance 4, and may determine that utterance 4 is a request for a particular media item, such as a song entitled "My Song," to be played on television 20. Backend system 100 may also generate a first response to utterance 4, such as audio message 8, for television 20, which indicates that the requested media item is being output thereon. For example, audio data 12 representing audio message 8, "Playing 'My Song'," may be sent to television 20 to be output thereby.

Upon sending audio data 12 to television 20, backend system 100 may further send an instruction 22 to electronic device 30 that causes electronic device 30 to begin sending audio data 24 representing sounds detected thereby. Thus, backend system 100 may cause electronic device 30 to monitor local sounds to determine whether or not audio message 8 is output by television 20. In some embodiments, upon receiving audio data 24, backend system 100 may generate text data representing audio data 24. The generated text data may then be compared to text data representing audio message 8 to determine a similarity value that indicates whether electronic device 30 was capable of detecting audio message 8 being output by television 20. If the similarity value is greater than a predefined similarity threshold, then this may indicate that television 20 is properly configured to output content thereon. Backend system 100 may, therefore, generate a link to the requested content, and may send that link to television 20, such that the requested content may be output by television 20.

If, however, the determined similarity value is less than or equal to the predefined similarity threshold value, then backend system may generate first text data representing audio message 28, and then may generate audio data 18 from the text data using TTS module 264. Audio data 18 may then be sent from backend system 100 to electronic device 10 such that audio message 28, "'My Song' is playing on your TV," may be output by electronic device 10.

In some embodiments, backend system 100 may also generate text data representing audio message 6, generate audio data 22 representing this text data, and may send audio data 22 to electronic device 10. For example, audio message 6 may be, "Sorry, your TV doesn't appear to be on. Would you like to play 'My Song' here?"

In some embodiments, in addition to sending audio data 22, backend system 100 may send an instruction to electronic device 10 that causes electronic device 10 to send additional audio data 32 representing additional audio captured by electronic device 10 after audio message 6 outputs. For example, backend system 100 may send audio data 22 and instructions for electronic device 10 to send audio data 32 representing additional audio captured by electronic device 10. If, for instance, individual 2 utters an additional statement in response to audio message 6, then audio data 32 likely will include that utterance. As an illustrative example, in response to audio message 6, asking if the song, "My Song," should begin playing on electronic device 10, individual 2 may respond with answer 26, "Yes." Therefore, electronic device 10 may send audio data 32 representing local audio captured by electronic device 10, which includes audio of answer 26, to backend system 100. Upon receipt, backend system 100 may generate text data representing answer 26, determine an intent of answer 26, and perform any other additional functionality, as described previously. For instance, answer 26 may indicate that electronic device 10 is to output the song, and therefore backend system 100 may generate and send a URL for the requested content to electronic device 10, such that the requested content may begin to be output by electronic device 10.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method, comprising:
    receiving, by a first device, an utterance corresponding to a request to output content using a second device;
    determining input audio data corresponding to audio received by the first device, the audio received after the utterance;
    processing the input audio data with respect to sound profile data; and
    in response to the processing, determining status data corresponding to the second device.

2. The method of claim 1, further comprising:
    determining that the request corresponds to a request to output a first content item using the second device; and
    selecting the sound profile data based at least in part on the first content item.

3. The method of claim 1, further comprising:
    selecting the sound profile data based at least in part on the second device.

4. The method of claim 1, wherein processing the input audio data with respect to the sound profile data comprises:
    comparing the audio data to the sound profile data to determine a similarity value; and
    determining the similarity value is greater than a similarity threshold value.

5. The method of claim 1, wherein the status data indicates that the second device is operational and wherein the method further comprises:
    outputting, by the first device, an acknowledgement of the request.

6. The method of claim 5, further comprising:
    sending an indication to a remote device that the second device is operational.

7. The method of claim 1, wherein the status data indicates that the second device is not outputting the content and wherein the method further comprises:
    outputting, by the first device, an indication that the request cannot be executed.

8. The method of claim 7, further comprising:
    causing the content to be output using the first device.

9. The method of claim 1, wherein the status data indicates that the second device is not outputting the content and wherein the method further comprises:
    outputting, by the first device, an indication to check an operational state of the second device.

10. The method of claim 1, wherein the status data indicates that the second device is not outputting the content and wherein the method further comprises:
    causing a command to be sent to the second device to alter an operational status of the second device.

11. A system, comprising:
    at least one processor; and
    memory including instructions operable to be executed by the at least one processor to perform a set of actions to cause the system to:
        receive, by a first device, an utterance corresponding to a request to output content using a second device;
        determine input audio data corresponding to audio received by the first device, the audio received after the utterance;
        process the input audio data with respect to sound profile data; and
        in response to processing the input audio data with respect to the sound profile data, determine status data corresponding to the second device.

12. The system of claim 11, wherein the memory further comprises instructions that, when executed by the at least one processor, further cause the system to:
    determine that the request corresponds to a request to output a first content item using the second device; and
    select the sound profile data based at least in part on the first content item.

13. The system of claim 11, wherein the memory further comprises instructions that, when executed by the at least one processor, further cause the system to:

select the sound profile data based at least in part on the second device.

14. The system of claim 11, wherein the instructions that cause the system to process the input audio data with respect to the sound profile data comprise instructions that cause the system to:
    compare the input audio data to the sound profile data to determine a similarity value; and
    determine the similarity value is greater than a similarity threshold value.

15. The system of claim 11, wherein the status data indicates that the second device is operational and wherein the memory further comprises instructions that, when executed by the at least one processor, further cause the system to:
    output, by the first device, an acknowledgement of the request.

16. The system of claim 15, wherein the memory further comprises instructions that, when executed by the at least one processor, further cause the system to:
    send an indication to a remote device that the second device is operational.

17. The system of claim 11, wherein the status data indicates that the second device is not outputting the content and wherein the memory further comprises instructions that, when executed by the at least one processor, further cause the system to:
    output, by the first device, an indication that the request cannot be executed.

18. The system of claim 17, wherein the memory further comprises instructions that, when executed by the at least one processor, further cause the system to:
    cause the content to be output using the first device.

19. The system of claim 11, wherein the status data indicates that the second device is not outputting the content and wherein the memory further comprises instructions that, when executed by the at least one processor, further cause the system to:
    output, by the first device, an indication to check an operational state of the second device.

20. The system of claim 11, wherein the status data indicates that the second device is not outputting the content and wherein the memory further comprises instructions that, when executed by the at least one processor, further cause the system to:
    cause a command to be sent to the second device to alter an operational status of the second device.

\* \* \* \* \*